(12) United States Patent
Guzzardo

(10) Patent No.: US 6,883,806 B2
(45) Date of Patent: Apr. 26, 2005

(54) NOTCHED BLADE SEAL FOR HIGH PERFORMANCE AIRCRAFT

(75) Inventor: Bryan J. Guzzardo, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 588 days.

(21) Appl. No.: 09/964,149

(22) Filed: Sep. 25, 2001

(65) Prior Publication Data

US 2003/0057659 A1 Mar. 27, 2003

(51) Int. Cl.$^7$ .............................................. F16J 15/02
(52) U.S. Cl. .................... 277/628; 277/652; 277/654
(58) Field of Search ................. 277/628, 630, 277/637, 641, 644, 650, 652, 653, 654

(56) References Cited

U.S. PATENT DOCUMENTS

| | | | | |
|---|---|---|---|---|
| 4,645,217 A | * | 2/1987 | Honeycutt et al. | 277/555 |
| 5,657,998 A | * | 8/1997 | Dinc et al. | 277/653 |
| 5,706,648 A | * | 1/1998 | Porte et al. | 244/54 |
| 5,913,494 A | * | 6/1999 | Burbridge et al. | 244/130 |

* cited by examiner

Primary Examiner—William L. Miller
(74) Attorney, Agent, or Firm—Baker Botts L.L.P.

(57) ABSTRACT

A notched blade seal for covering a gap between a wing and a wing flap of a high performance aircraft includes a bottom seal strip of a flexible, resilient material having a plurality of spaced-apart notches defining a plurality of finger portions, and a top seal strip, also of a flexible, resilient material having a plurality of spaced-apart notches defining a plurality of finger portions. The top seal strip overlies and engages the bottom seal strip and is positioned relative to the bottom seal strip such that the finger portions of the top seal strip overlie and cover the notches in the bottom seal strip.

9 Claims, 1 Drawing Sheet

NOTCHED BLADE SEAL FOR HIGH PERFORMANCE AIRCRAFT

TECHNICAL FIELD OF THE INVENTION

The present invention relates generally to the field of high performance aircraft and, more particularly, to notched blade seals of the type used to cover the gap at the juncture between a wing and a flap.

BACKGROUND OF THE INVENTION

High performance aircraft have flaps along parts of the leading and trailing edges of the wings that pivot but do not extend like the flaps of, for example, commercial airliners. It is well-known to provide seal strips over the gaps between the wing surfaces and the flap surfaces. Where portions of the wings and the flaps have doubly-curved surfaces, such as, for example, at the locations of flap actuators, it is previously known to provide seal strips that are of stainless steel, are tapered in the widthwise direction, and have spaced-apart notches along the thinner edges that form a series of fingers. The seal strips are attached along their thicker edges to the wings so that the fingers extend over the flaps. As the fingers of the sealing strips flex during pivotal movements of the flaps relative to the wings, the tips of the fingers also move closer together or farther apart, depending on the particular geometry, so as to conform to the repositioning of the doubly-curved surfaces of the flaps.

The notches in the sealing strips prevent the sealing strips from fully covering the gaps between the wings and flaps, thus allowing air to intrude into the gap and produce perturbations of the air flow over the seal strip. Such perturbations not only increase drag, but also contribute to increased RF energy, which is undesirable for low observable aircraft. It would be advantageous to eliminate air intrusion into the gap and to prevent disruptions in the smoothness of the flow along a seal strip. There is, accordingly, a need for a sealing strip structure that fully covers the gaps between the wings and flaps of high performance aircraft along portions where the wings and flaps are doubly curved.

SUMMARY OF THE INVENTION

The foregoing need is fulfilled, in accordance with the present invention, by a notched blade seal for covering a gap between a wing and a wing flap of a high performance aircraft. The notched blade seal has a bottom seal strip of a flexible, resilient material having a plurality of spaced-apart notches defining a plurality of finger portions, and a top seal strip of a flexible, resilient material having a plurality of spaced-apart notches defining a plurality of finger portions. The top seal strip overlies and engages the bottom seal strip and is positioned relative to the bottom seal strip such that the fingers of the top seal strip overlie and cover the notches in the bottom seal strip. The layered notched seal structure of the present invention eliminates the gaps between the fingers of a single layer and improves the air flow over the seal strip. Also, the notches can be shaped or aligned with other features of the aircraft to reduce RF energy.

In preferred embodiments of the present invention, the notches in each seal strip are aligned with other features of the aircraft. Preferably, but not necessarily, the notches are uniformly spaced apart. In some embodiments, the notches in the bottom seal strip have parallel side edges and a radiused end edge. The side edges of each of the notches in the bottom seal strip are substantially perpendicular to the edge of the bottom seal strip. The radius of the end edge of each notch may be substantially equal to one-half of the width of notch between the side edges, thus making it a continuous arc that joins the side edges. The notches in the bottom seal strip may be identical and equally spaced apart. For ease and economy of manufacture, the bottom seal strip and top seal strip may be identical.

In other embodiments, the notches in the top seal strip are triangular in plan and are arranged with a base of the triangle at the edge of the strip and the apex spaced apart from the edge. The triangular notches in the top seal strip may be isosceles triangles.

Notched blade seals according to the invention, preferably, have bottom and top seal strips that are tapered widthwise and have the notches and fingers along the thinner edge. The blade seals may be manufactured in various lengths, widths and thicknesses and of various materials, including metallics and composites, as required by the particular type aircraft in question.

The foregoing description has outlined rather broadly some features and advantages of the present invention. The detailed description of embodiments of the invention that follows will enable the present invention to be better understood and the present contribution to the art to be more fully appreciated. Those skilled in the art will recognize that the embodiments may be readily utilized as a basis for modifying or designing other structures and methods for carrying out the purposes of the present invention. All such structures and methods are intended to be included within the spirit and scope of the invention as set forth in the appended claims.

DETAILED DESCRIPTION OF THE INVENTION

Figure 1:
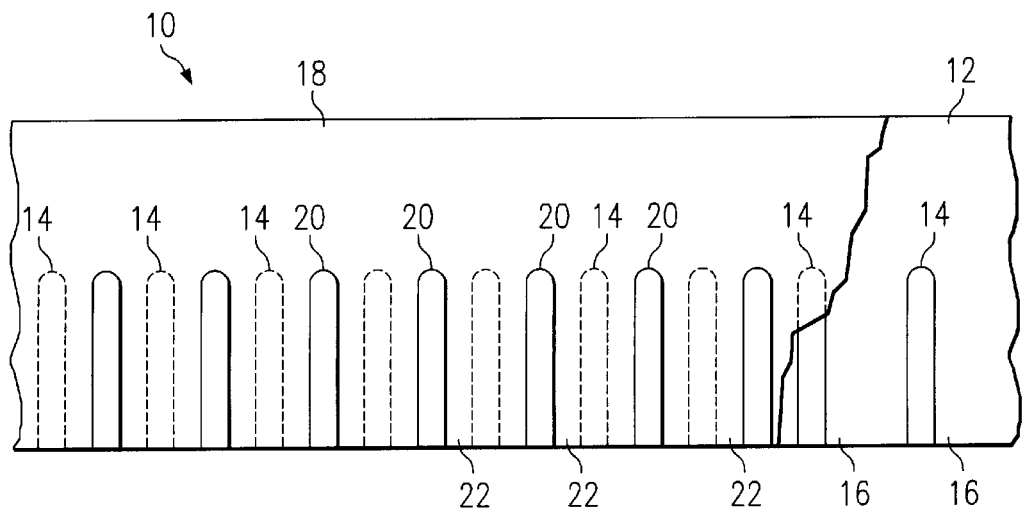
FIG. 1 is a plan view of a first embodiment, a portion of the top seal strip being cut away.
Figure 2:
FIG. 2 is an end elevational view of the first embodiment and the drawing being on a larger scale than that of FIG. 1.

In the first embodiment, which is shown in FIGS. 1 and 2, the notched blade seal 10 has a bottom seal strip 12 of a flexible, resilient material. A plurality of spaced-apart notches 14 define a plurality of finger portions 16. A top seal strip 18 of a flexible, resilient material, which has a plurality of spaced-apart notches 20 defining a plurality of finger portions 22, overlies and engages the bottom seal strip 12 and is positioned relative to the bottom seal strip such that the finger portions 22 of the top seal strip overlie and cover the notches 14 in the bottom seal strip 12.

The bottom seal strip 12 and the top seal strip 18 are identical except for the positions of the notches 14 and 20 relative to the longitudinal ends. Each strip is formed from a band of stainless steel, which is tapered uniformly from a wider edge remote from the finger portions to a narrower edge that defines the tips of the finger portions. The dimensions of the band, including the width and the thickness, will vary depending upon the wing configuration.

The notches 14 and 20, which are typically 0.125 inch wide, have parallel side edges that lie perpendicular to the longer edges of the strip. The end of each notch has a radius of about 0.060, thus making it semi-circular. The notches are 1.00 inch apart center to center.

The drawings show the strips 12 and 18 in flat form. In practice, the seal strips are plastically worked to provide curvatures in both the lengthwise and widthwise directions, the curvatures being selected to match the shapes of the wing and flap on which the seal strip is to be installed. The widthwise curvature is designed such that the finger portions 16 and 22 are biased into engagement with the flap in all positions of the flap.

Figure 3:
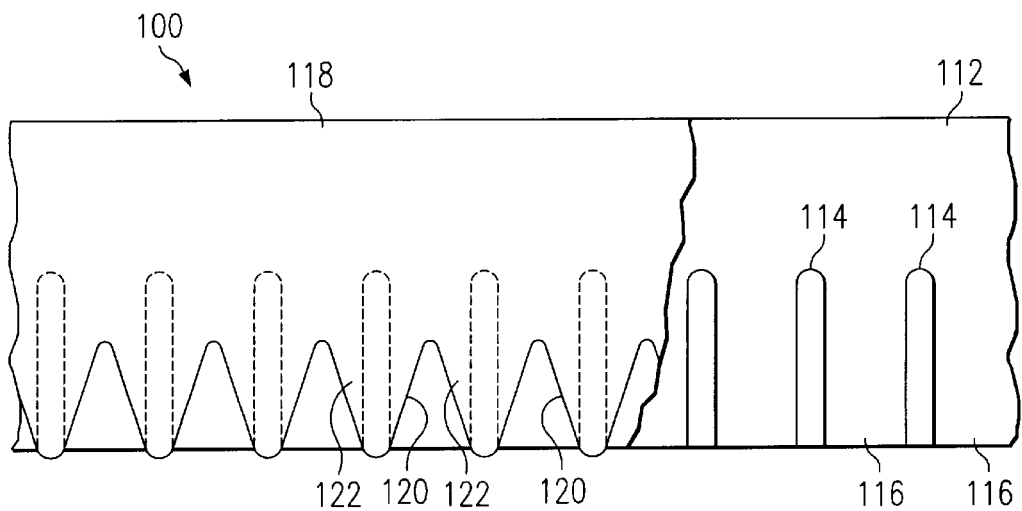
FIG. 3 is a plan view of a second embodiment, a portion of the top seal strip being cut away.

In the embodiment 100 of FIG. 3, the bottom strip 112 is the same of the bottom strip 12 of FIG. 1. The top strip 118 has notches 120 that are isosceles triangular in plan, thus to form isosceles triangular finger portions 122. The finger portions 122 are located so that they cover the notches 114 in the bottom strip 112. The top strip is formed of the same stainless steel band material as the bottom strip 112.

Although the present invention has been described with reference to specific embodiments, it is not intended that the same be taken in a limiting sense. Accordingly, it is understood that the scope of the invention in its broader aspects is to be defined by the appended claims and no limitation is to be inferred from definitive language used in describing the preferred embodiments.

What is claimed is:

1. A notched blade seal for covering a gap between a wing and a wing flap of a high performance aircraft, comprising:
    a bottom seal strip of a flexible, resilient material having a generally right triangle cross-section configuration and a plurality of spaced-apart notches defining a plurality of finger portions, and
    a top seal strip of a flexible, resilient material having a generally right triangle cross-section configuration similar to the bottom seal strip and also having a plurality of spaced-apart notches defining a plurality of finger portions,
        the top seal strip overlying and engaging the bottom seal strip along one leg of the generally right triangle cross-section configuration and being positioned relative to the bottom seal strip such that the fingers of the top seal strip overlie and cover the notches in the bottom seal strip.

2. The notched blade seal according to claim 1, wherein the notches in each seal strip are uniformly spaced apart.

3. The notched blade seal according to claim 1, wherein the notches in the top seal strip comprise a triangular configuration in plan and arranged with a base of the triangle at the edge of the strip and the apex spaced apart from the edge.

4. The notched blade seal according to claim 3, wherein the triangular notches in the top seal strip comprise isosceles triangles.

5. The notched blade seal according to claim 1, wherein each seal strip comprises a uniform width along the longitudinal extent, and wherein the notches and fingers are along the thinner edge of the right triangle configuration.

6. A notched blade seal for covering a gap between a wing and a wing flap of a high performance aircraft, comprising:
    an elongated bottom seal strip having a generally right triangle cross-section configuration and a plurality of spaced-apart notches defining a plurality of spaced-apart finger portions, and
    an elongated top seal strip having a generally right triangle cross-section configuration similar to the bottom seal strip and also having a plurality of spaced-apart notches defining a plurality of finger portions,
        the top seal strip overlying and engaging the bottom seal strip along one leg of the generally right triangle cross-section configuration and being positioned relative to the bottom seal strip such that the fingers of the top seal strip overlie and cover the notches in the bottom seal strip,
        each seal strip having a substantially uniform width along a longitudinal extent and being tapered widthwise from a thicker edge to a thinner edge, and
        the notches and fingers being along the thinner edge.

7. The notched blade seal according to claim 6, wherein the notches in each seal strip are uniformly spaced apart.

8. The notched blade seal according to claim 6, wherein the notches in the seal strips comprise a shape to reduce RF energy.

9. The notched blade seal according to claim 6, wherein the notches in the top seal strip comprise an isosceles triangular configuration in plan and spaced apart to reduce RF energy, further the notches in the top seal strip are arranged with a base of the triangle at the edge of the strip and the apex spaced apart from the edge.

* * * * *